G. B. SOUTHARD.
PLANTING POT.
APPLICATION FILED FEB. 16, 1914. RENEWED OCT. 27, 1915.
1,187,397.
Patented June 13, 1916.
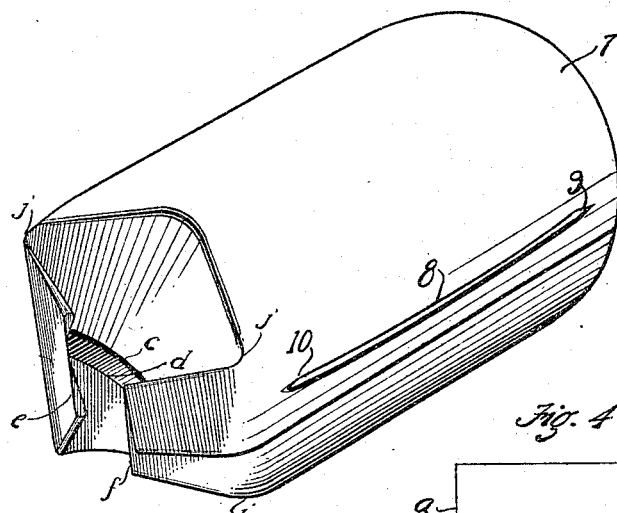
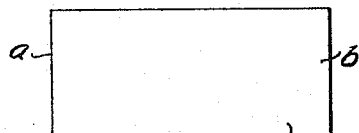
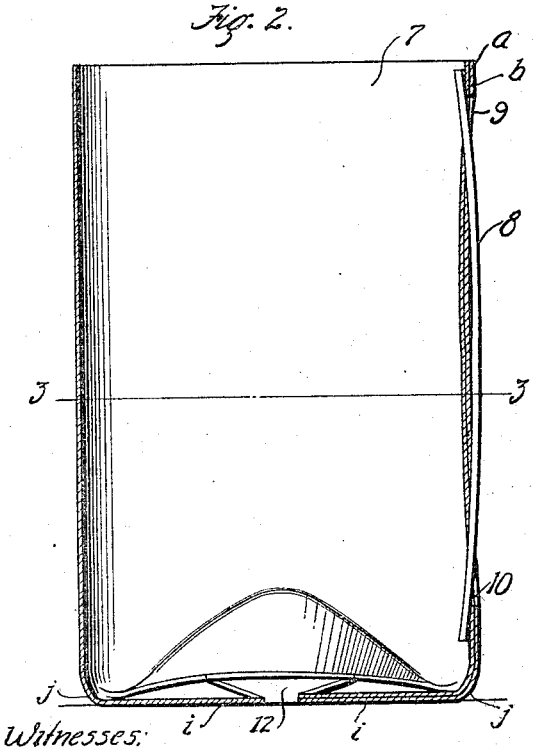
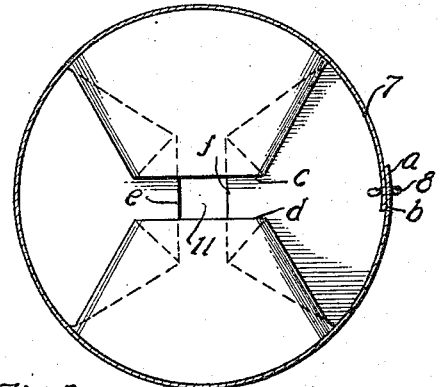
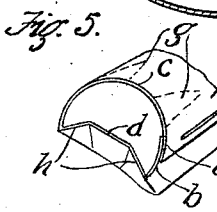
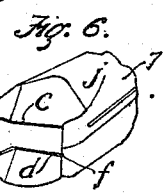
Witnesses:
James M. Abbott
Marguerite Bates
Inventor.
George B. Southard
By Hazard & Mason
Attys.

UNITED STATES PATENT OFFICE.

GEORGE B. SOUTHARD, OF REDLANDS, CALIFORNIA, ASSIGNOR OF ONE-FOURTH TO NETTIE N. CHILDS AND ONE-FOURTH TO THERESA A. NYE, OF LOS ANGELES, CALIFORNIA.

PLANTING-POT.

1,187,397.

Specification of Letters Patent. Patented June 13, 1916.

Application filed February 16, 1914, Serial No. 818,857. Renewed October 27, 1915. Serial No. 58,299.

*To all whom it may concern:*

Be it known that I, GEORGE B. SOUTHARD, a citizen of the United States, residing at Redlands, in the county of San Bernardino, State of California, have invented new and useful Improvements in Planting-Pots, of which the following is a specification.

This invention relates to a planting pot, and it is the object of this invention to provide a planting pot which can be easily and economically manufactured of cheap materials, and which is particularly advantageous for use by nurserymen and the like in propagating small plants.

Another object is to provide a planting pot which can be separated to remove it from the soil contained therein so as not to disturb the roots of the plant.

A further object is to provide a planting pot formed of paper or similar material in which the material is so folded at the base of the pot as to form a support therefor, by which the bottom of the pot will be elevated a short distance above the supporting surface to permit a free circulation of air beneath a vent in the bottom of the pot and to facilitate drainage.

The invention primarily resides in a pot formed of sheet paper or similar flexible material, detachable means for securing the ends of the sheet together to form the cylindrical walls of a pot; one end of the cylinder thus formed being folded to form the bottom of the pot with a vent, and projections by which the bottom of the pot will be elevated above its supporting surface.

The invention is illustrated in the accompanying drawings, in which,

Figure 1 is a perspective view of the pot as seen from its bottom end. Fig. 2 is a vertical section of same illustrating the manner of joining the ends of a rectangular blank together to form a cylinder, and showing the manner in which the pot is supported to permit circulation of air thereunder. Fig. 3 is a horizontal section and plan on the line 3—3 of Fig. 2. Fig. 4 illustrates the blank from which the pot is formed. Figs. 5 and 6 are diagrams illustrating the manner of folding the bottom end of the pot.

More specifically 7 indicates a rectangular blank for forming the side walls and bottom of the pot, which blank is preferably made of paper or similar material having a flexible character, yet possessing sufficient rigidity to form a substantial structure. This blank 7 may be waterproofed in any desired manner; the ordinary tarred paper of commerce effectively serving the purpose.

In forming the cylindrical walls of the pot the ends —a— and —b— of the blank 7 are joined together by means of a substantially straight wire 8, the ends of which are thrust through perforations 9 and 10 formed in the overlapped ends of the blank, as particularly shown in Fig. 2; the ends of the wire 8 projecting beyond the opposite end walls of the perforations 9 and 10 to form an effective binder. The fastening wire is preferably inserted in place from the perforations 9 and 10 when the pot is filled with earth to separate the ends —a— and —b— and permit the removal of the pot from its contents without breaking the soil and disturbing the roots of the plant therein.

The bottom of the pot is formed by folding the cylinder formed as just described in a peculiar manner by which the bottom of the pot will be disposed above its supporting surface to form an air passage there-beneath. The manner of folding the end of the cylinder is particularly illustrated in Figs. 5 and 6, which shows the initial steps in the process of forming the folds, the final step of which is shown in Fig. 1. In forming the bottom of the pot the opposite edges —c— and —d— of one end of the cylinder at right angles to the overlapped ends —a— and —b— of the blank, are inturned toward each other to form substantially horizontally extending fold portions —e— and —f— as shown in Fig. 6. The fold portions —e— and —f— are of such length as to space the edges —c— and —d— a short distance apart to form a vent 11 in the bottom of the pot, and the folds —e— and —f— are extended from points —g— well up on diametrically opposite sides of the cylinder so as to arch the bottom portions —e— and —f— transversely as shown in Figs. 1 and 2, when the bottom is completed.

In folding the portions —e— and —f— triangular shaped fold portions —h— are formed at the ends thereof connecting with the projecting continuations —i— on opposite sides of the cylinder end. The projections —i— are then inturned toward each other, as shown in Fig. 1, to extend on a substantially horizontal plane beneath the arched bottom portions —e— and —f—; the fold line —j— at the intersection of the portions —i— and the cylindrical walls of the pot extending approximately on a straight line parallel with the top of the pot to form a substantial base or support along opposite sides of the pot.

When the pot is disposed in an upright position on a supporting surface, as shown in Fig. 2, an air space 12 will be formed between the arched bottom portions —e— and —f— and the inturned supporting portions —i—, which air space is open at opposite sides of the pot between the supporting base at the fold lines —j— and forms a passage for the circulation of air beneath the bottom of the pot and communicates with the vent 11 therein to aerate the soil in the bottom of the pot at this point.

While I have shown and described the pot as formed of a single blank 7, it is manifest that where additional rigidity is required the number of blanks may be multiplied to any desired extent. By arching the bottom portions —e— and —f— the tendency of the weight of the earth in the pot to press these portions flat against the supporting surface and thereby close the air passage 12 is obviated and permits the use of a light material in the construction of the pot.

When it is desired to remove a plant from the pot the wire fastener 8 is removed and the overlapped ends —a— and —b— of the cylinder drawn apart, which will permit of the cylindrical walls of the pot being readily removed from the earth molded therein without disturbing the roots of the plant.

A pot of this character is readily adapted to be made up as used, and is of such cheap construction that the body portions may be thrown away after once used; the wire fasteners, 8, however, can be used a number of times.

What I claim is:

1. A planting pot, comprising a cylinder formed of a rectangular blank with the ends detachably secured together, one end of said cylinder inturned on opposite sides to form an arched bottom with a vent and having the opposite sides at right angles to the inturned arched portions bent inwardly to form a supporting base for the pot by which a passage is formed beneath the pot.

2. In a planting pot formed of a rectangular blank with the ends of the blank overlapping to form a cylinder and one end of the cylinder folded to form an arched bottom said bottom being provided with a vent therein, means for detachably securing the ends of the blank together comprising a wire having its ends thrust through perforations in the overlapped ends of the blank.

3. A planting pot, comprising a cylindrical wall formed of a rectangular blank having its ends overlapped, means for detachably connecting the ends of the blank together comprising a wire having its ends thrust through perforations in the overlapped ends of the blank from the exterior of the cylinder thus formed, said cylinder having oppositely inturned portions on one end thereof, said inturned portions arched transversely to form a passage therebeneath opening at opposite sides of the cylinder and communicating with a vent space between the ends of the inturned portions, and inturned portions on opposite sides of the end of the cylinder at right angles to the arched inturned portions forming supporting members for the pot.

In witness that I claim the foregoing I have hereunto subscribed my name this 30th day of January, 1914.

GEO. B. SOUTHARD.

Witnesses:
 EDMUND A. STRAUSE,
 MARIE BATTEY.

Copies of this patent may be obtained for five cents each, by addressing the "Commissioner of Patents, Washington, D. C."